US012654577B2

(12) United States Patent
Peterson et al.

(10) Patent No.: US 12,654,577 B2
(45) Date of Patent: Jun. 16, 2026

(54) CHARGING INLET ASSEMBLY OF A VEHICLE

(71) Applicant: TE Connectivity Solutions GmbH, Schaffhausen (CH)

(72) Inventors: Kevin John Peterson, Kernersville, NC (US); Ram Kishore Venkatesan, Winston Salem, NC (US); Aaron James de Chazal, Rochester, MI (US); Matthew Bryan Hitchcock, Hershey, PA (US); Daniel Williams Fry, Jr., Middletown, PA (US)

(73) Assignee: TE Connectivity Solutions GmbH (CH)

( * ) Notice: Subject to any disclaimer, the term of this patent is extended or adjusted under 35 U.S.C. 154(b) by 361 days.

(21) Appl. No.: 18/467,347

(22) Filed: Sep. 14, 2023

(65) Prior Publication Data

US 2025/0091457 A1       Mar. 20, 2025

(51) Int. Cl.
    *B60L 53/16*           (2019.01)
(52) U.S. Cl.
    CPC ..................................... *B60L 53/16* (2019.02)

(58) Field of Classification Search
    CPC ..... B60L 53/16; B60L 53/18; H01R 13/6616; H01R 24/28; H01R 12/63; H01R 12/65; H02J 7/0045
    USPC ...................................................... 439/651, 34
    See application file for complete search history.

(56) References Cited

U.S. PATENT DOCUMENTS

| | | | | |
|---|---|---|---|---|
| 9,653,859 | B1 * | 5/2017 | Moore .................... | H01R 13/41 |
| 2016/0072224 | A1 * | 3/2016 | Ichio ..................... | H01R 13/629 |
| | | | | 439/345 |
| 2020/0067237 | A1 * | 2/2020 | Sarraf ................. | H01R 13/6683 |
| 2023/0057953 | A1 * | 2/2023 | Rhodes ................... | B60L 53/16 |
| 2025/0332932 | A1 * | 10/2025 | Venkatesan ............. | B60L 53/16 |

* cited by examiner

*Primary Examiner* — Hae Moon Hyeon

(57) ABSTRACT

A charging inlet assembly includes a charging inlet housing having terminal channels and cable channels. The charging inlet assembly includes charging terminals including a first charging terminal and a second charging terminal received in the corresponding terminal channels. The charging inlet assembly includes first and second cable assemblies received in the corresponding cable channels. The first cable assembly includes a first DC cable and a first AC cable both electrically connected to the first charging terminal. The second cable assembly includes a second DC cable and a second AC cable both electrically connected to the second charging terminal.

20 Claims, 8 Drawing Sheets

CHARGING INLET ASSEMBLY OF A VEHICLE

BACKGROUND OF THE INVENTION

The subject matter herein relates generally to vehicle charging systems.

Electric vehicles (EV) and hybrid electric vehicles (HEV) include battery systems for operating the vehicles. The battery systems are charged by a vehicle charging system. For example, a charging connector, which is coupled to a power source, is connected to a charging inlet assembly of the vehicle to charge the battery. Different vehicles use different components within the charging system, which makes repair or replacement of parts difficult. Additionally, components of some systems are not usable with components of other types of systems. For example, the systems may be designed to accommodate particular standards, such as the North American Charging Standard (NACS), the Combined Charging System (CCS) Standard, or other standard. Because the different standards use different pinout of charging pins and different types of cable harnesses, parts are not readily interchangeable between the various systems.

A need remains for reliable and cost effective vehicle charging systems for electric vehicles.

BRIEF DESCRIPTION OF THE INVENTION

In one embodiment, a charging inlet assembly for an electric vehicle is provided and includes a charging inlet housing having terminal channels and cable channels associated with the terminal channels. The charging inlet assembly includes charging terminals received in the corresponding terminal channels and are held in the charging inlet housing. The charging terminals have pins configured to be connected to a charging plug. The charging terminals include a first charging terminal and a second charging terminal. The charging inlet assembly includes a first cable assembly received in the corresponding cable channels. The first cable assembly includes a first direct current (DC) cable and a first alternating current (AC) cable. The first DC cable and the first AC cable are separate and discrete cables. The first DC cable and the first AC cable both are electrically connected to the first charging terminal. The charging inlet assembly includes a second cable assembly received in the corresponding cable channels. The second cable assembly includes a second DC cable and a second AC cable. The second DC cable and the second AC cable are separate and discrete cables. The second DC cable and the second AC cable both are electrically connected to the second charging terminal.

In another embodiment, a charging inlet assembly for an electric vehicle is provided and includes a charging inlet housing having terminal channels and cable channels associated with the terminal channels. The charging inlet assembly includes charging terminals received in the corresponding terminal channels and held in the charging inlet housing. The charging terminals have pins at mating ends configured to be connected to a charging plug. The charging terminals have terminal busbars at terminating ends opposite the mating ends. The charging terminals include a first charging terminal and a second charging terminal. The charging inlet assembly includes a first cable assembly received in the corresponding cable channels. The first cable assembly includes a first adapter busbar. The first cable assembly includes a first DC cable and a first AC cable. The first DC cable and the first AC cable are separate and discrete cables.

The first DC cable and the first AC cable both electrically connected to the first adapter busbar. The first adapter busbar is electrically connected to the terminal busbar of the first charging terminal. The charging inlet assembly includes a second cable assembly received in the corresponding cable channels. The second cable assembly includes a second adapter busbar. The second cable assembly includes a second DC cable and a second AC cable. The second DC cable and the second AC cable are separate and discrete cables. The second DC cable and the second AC cable both are electrically connected to the second adapter busbar. The second adapter busbar is electrically connected to the terminal busbar of the second charging terminal.

In a further embodiment, a charging inlet assembly for an electric vehicle is provided and includes a charging inlet housing having terminal channels and cable channels associated with the terminal channels. The charging inlet assembly includes charging terminals received in the corresponding terminal channels and held in the charging inlet housing. The charging terminals have pins at mating ends configured to be connected to a charging plug. The charging terminals have terminating connectors at terminating ends. The charging terminals include a first charging terminal and a second charging terminal. The charging inlet assembly includes a first cable assembly received in the corresponding cable channels. The first cable assembly includes a first DC cable and a first AC cable. The first DC cable and the first AC cable are separate and discrete cables. The first cable assembly includes a first connector. The first DC cable and the first AC cable both are electrically connected to the first connector. The first connector is electrically coupled to the terminating connector of the first charging terminal at a first separable interface. The charging inlet assembly includes a second cable assembly received in the corresponding cable channels. The second cable assembly includes a second DC cable and a second AC cable. The second DC cable and the second AC cable are separate and discrete cables. The second cable assembly includes a second connector. The second DC cable and the second AC cable both are electrically connected to the second connector. The second connector is electrically coupled to the terminating connector of the second charging terminal at a second separable interface.

DETAILED DESCRIPTION OF THE INVENTION

Figure 1:
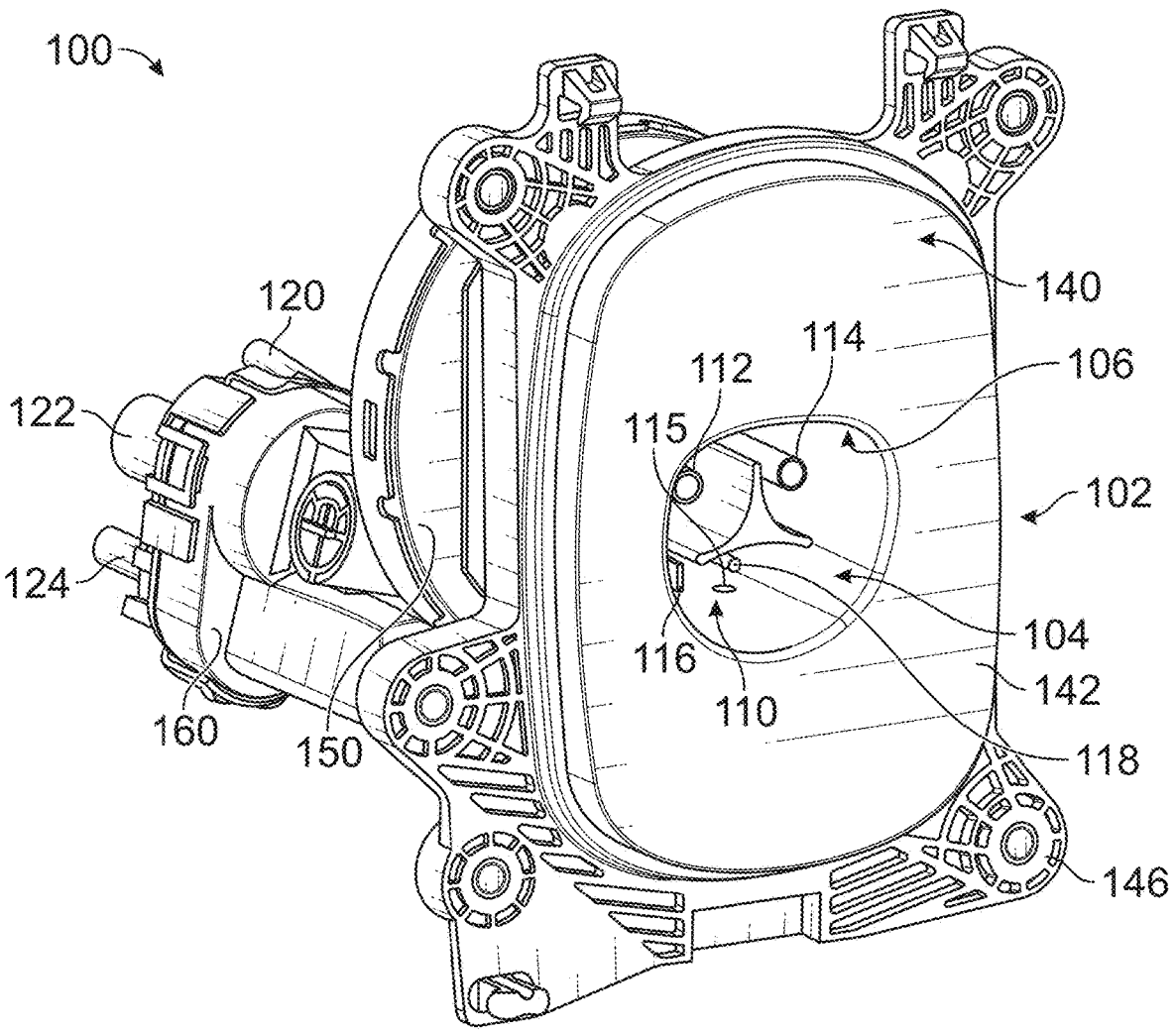
FIG. 1 is a front perspective view of a charging inlet assembly in accordance with an exemplary embodiment.
Figure 2:
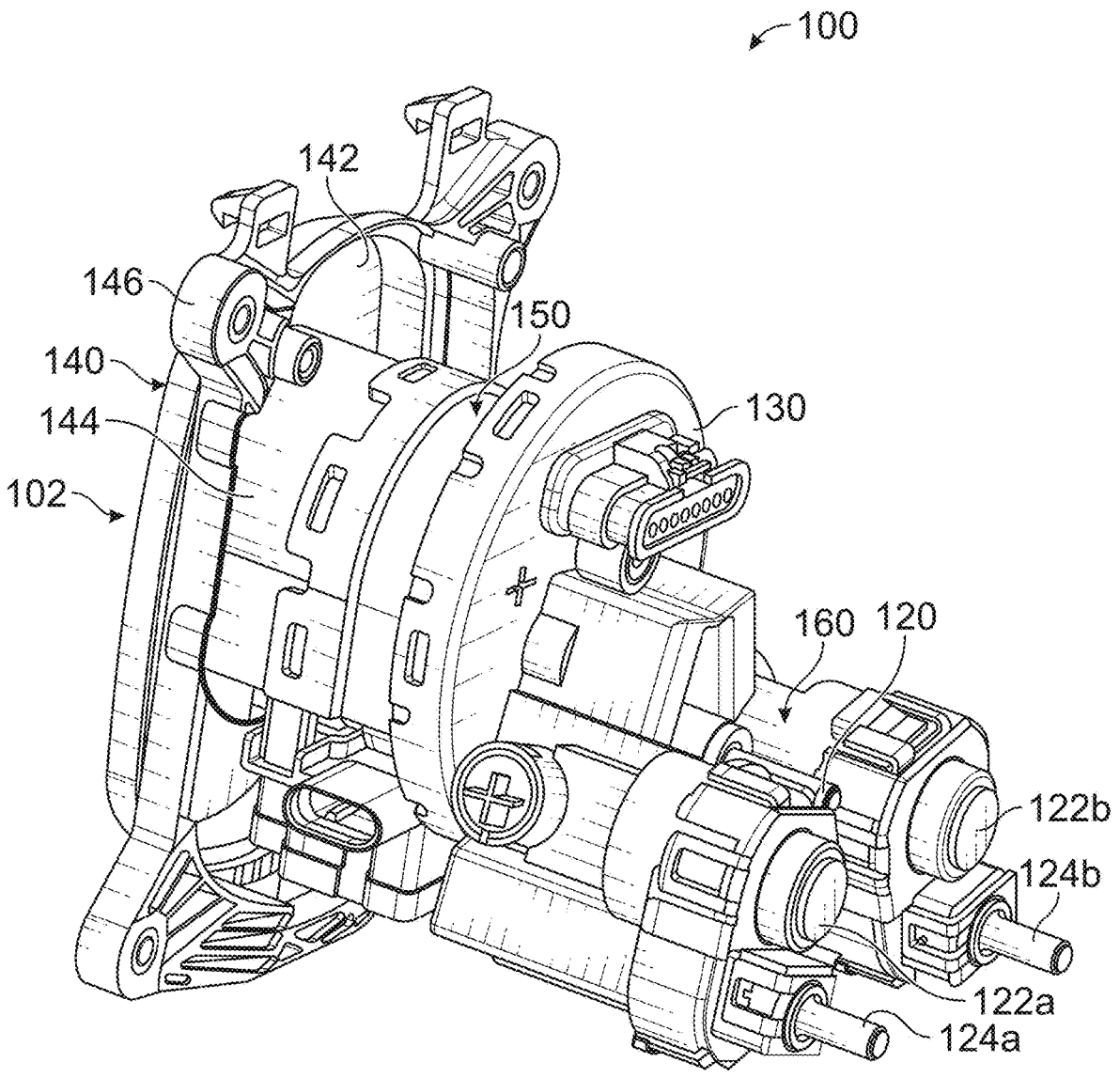
FIG. 2 is a rear perspective view of the charging inlet assembly in accordance with an exemplary embodiment.

FIG. 1 is a front perspective view of a charging inlet assembly 100 in accordance with an exemplary embodiment. FIG. 2 is a rear perspective view of the charging inlet assembly 100 in accordance with an exemplary embodiment. The charging inlet assembly 100 is configured to be mated with a complimentary charging component (not shown), such as a charging connector or plug charger.

The charging inlet assembly 100 defines a power connector configured to be electrically connected to the plug charger for charging a battery system of a vehicle, such as an electric vehicle (EV) or hybrid electric vehicle (HEV). In an exemplary embodiment, the charging inlet assembly 100 is configured for mating with a North American Charging Standard (NACS) charging plug. For example, the charging inlet assembly 100 has an NACS inlet interface and pinout. Other inlet configurations may be used in alternative embodiments.

The charging inlet assembly 100 includes a charging inlet housing 102 configured to be mounted in the vehicle. The charging inlet housing 102 forms a portion of the power connector for mating with the charging connector. For example, the charging inlet housing 102 includes a receptacle 104 (FIG. 1) that receives the charging plug. The charging inlet assembly 100 includes a plurality of charging terminals 110 (FIG. 1) for connection to the charging plug. Power cables 120 (FIG. 2) are electrically connected to the charging terminals 110 and routed within the vehicle, such as to the battery.

In an exemplary embodiment, the charging terminals 110 are configured for both AC charging and DC charging. In an exemplary embodiment, the charging terminals 110 include a first charging terminal 112, a second charging terminal 114, a ground terminal 115, a control pilot terminal 116, and a proximity pilot terminal 118. The first charging terminal 112 may be used for positive current (DC+) or split phase AC (Line 1) or single phase AC (Line). The second charging terminal 114 may be used for negative DC (DC−) or split phase AC (Line 2) or single phase AC (Neutral). The ground terminal 115 is tied to a full-current protective grounding system. The control pilot 116 is used for charging state/current signaling. The proximity pilot 118 is used for vehicle connector status signaling.

In an exemplary embodiment, the power cables 120 are electrically connected to corresponding charging terminals 110. The power cables 120 may be routed to other components within the vehicle, such as the battery, an on board charger, a battery control unit, a vehicle control interface module, the vehicle body (for grounding), and the like. In an exemplary embodiment, the power cables 120 may be configured to transmit AC power and/or DC power. For example, AC power may be transmitted to the onboard charger while DC power and/or AC power may be transmitted to the battery for charging the battery. In an exemplary embodiment, the power cables include both DC cables 122 and AC cables 124. For example, a pair of power cables 120 (such as a first DC cable 122*a* and a first AC cable 124*a*) are electrically connected to the first charging terminal 112 and extend from the charging inlet housing 102 and a pair of power cables 120 (such as a second DC cable 122*b* and a second AC cable 124*b*) are electrically connected to the second charging terminal 114 and extend from the charging inlet housing 102. The DC cables 122 may transmit high voltage for charging the battery and the AC cables 124 may transmit low voltage for charging the battery or the onboard charger. The DC and AC cables 122, 124 are both connected to the corresponding charging terminals 112, 114 within the charging inlet housing 102. The internal connection is made to make cable routing easier. Providing both the DC cables 122 and the AC cables 124 allows for routing to different components for example, the battery and the onboard charger). Providing both the DC cables 122 and the AC cables 124 allows the charging inlet assembly 100 to easily interface with vehicles or cable harnesses that comply with the Combined Charging System (CCS) standard. As such, the charging inlet assembly 100 may be easily retrofit into existing vehicles or vehicle designs.

In an exemplary embodiment, the charging inlet assembly 100 includes an interface connector 130 (FIG. 2). The interface connector 130 may be electrically connected to the ground terminal 115 and/or the control pilot terminal 116 and/or the proximity pilot terminal 118. The interface connector 130 may be connected to other components, such as temperature sensors used to monitor operating temperatures of the charging terminals 112, 114. A connector or wires (not shown) may be electrically connected to the interface connector 130 to connect to another component, such as a battery control unit (not shown) of the battery system. Data is transmitted between the charging inlet assembly 100 and the battery system, such as data relating to the charging operation. For example, the data may relate to charging start/stop, operating temperature of the charging terminals 112, 114, or other charging data. A proximity signal may be sent to the battery system indicating when the charging device is mated to the power connector of the charging inlet assembly 100.

In an exemplary embodiment, the charging inlet housing 102 is a multi-piece housing. For example, the charging inlet housing 102 includes a front housing 140, a terminal housing 150, and a cable housing 160. The housing pieces are assembled together to form the charging inlet housing 102. The front housing 140 forms a charging plug interface 106 at the front of the charging inlet housing 102. The charging plug interface 106 is configured to interface with the charging plug. The front housing 140 is configured to be mounted to the vehicle. The terminal housing 150 holds and surrounds the charging terminals 110. The cable housing 160 holds and surrounds the power cables 120.

The front housing 140 includes a front wall 142 and a hub 144 extending from the rear of the front wall 142. The terminal housing 150 is configured to be coupled to the hub 144. For example, the terminal housing 150 may be clipped, latched, secured using fasteners, or secured by other means to the hub 144. The hub 144 surrounds the receptacle 104. In an exemplary embodiment, the front wall 142 includes mounting flanges 146 used to couple the charging inlet assembly 100 to the vehicle. In various embodiments, the mounting flange(s) 146 may be a separate piece(s) coupled to the front wall 142. The front housing 140 may include a seal to seal the charging inlet assembly 100 to the vehicle.

Figure 3:
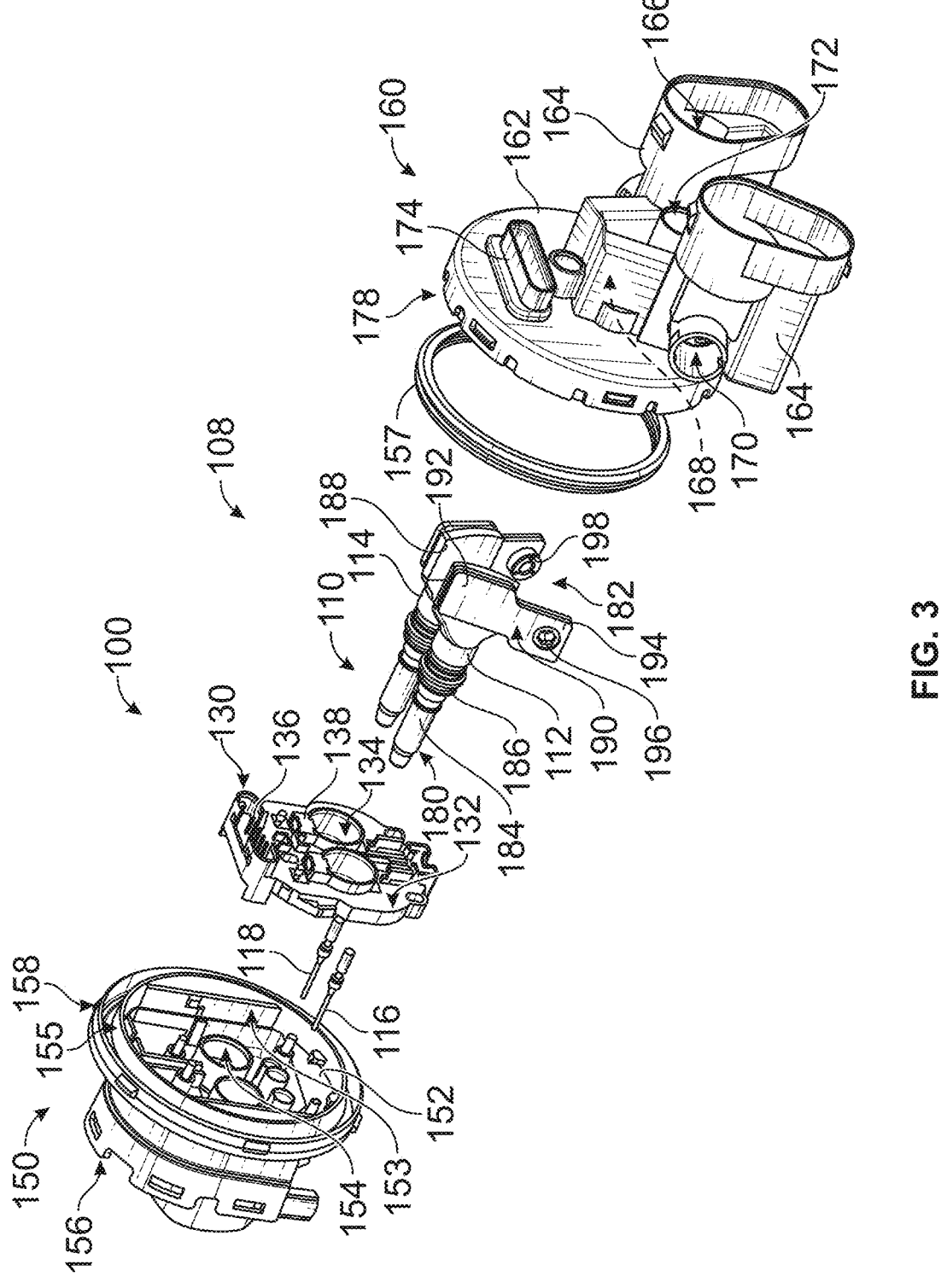
FIG. 3 is an exploded view of a portion of the charging inlet assembly in accordance with an exemplary embodiment.

FIG. 3 shows the terminal housing 150, the cable housing 160, the first and second charging terminals 112, 114, and a control module 132, which includes the interface connector 130. The control module 132 and the charging terminals 112, 114 are configured to be received in the terminal housing 150. The cable housing 160 is configured to be coupled to the terminal housing 150 to cover the control module 132 and the charging terminals 112, 114.

The terminal housing 150 includes a base 152 having a plurality of bores therethrough forming terminal channels 154 that receive the corresponding charging terminals 110. The base 152 may be generally circular shape. However, other shapes are possible in alternative embodiments. The base 152 includes a pocket 153 that receives the control module 132. For example, the pocket 153 is located at the rear of the base 152. The terminal housing 150 includes a seal pocket 155 at the rear configured to receive an interface seal 157. The seal pocket 155 may extend circumferentially around the terminal housing 150. The interface seal 157 is configured to be sealingly coupled to the terminal housing 150. The interface seal 157 may interface with the cable housing 160 to provide a sealed interface between the terminal housing 150 and the cable housing 160. The terminal housing 150 includes a front mounting bracket 156 at the front of the terminal housing 150 and a rear mounting bracket 158 at the rear of the terminal housing 150. The front mounting bracket 156 is configured to be coupled to the front housing 140 (FIG. 2). The rear mounting bracket 158 is configured to be coupled to the cable housing 160. The mounting brackets 156, 158 may include latches, clips, fasteners, or other securing means to secure the terminal housing 150 to the front housing 140 and the cable housing 160.

The cable housing 160 includes a main wall 162 and cable extensions 164 extending rearward from the main wall 162. The cable extensions 164 include cable channels 166 that receive the corresponding cables in the illustrated embodiment, the main wall 162 is generally circular in shape. However, other shapes are possible in alternative embodiments. In various embodiments, each cable extension 164 may include a plurality of cable channels 166 that receive corresponding cables. In an exemplary embodiment, the cable housing 160 includes pockets 168 that receive components of the charging inlet assembly 100, such as the charging terminals 110 and/or busbars and/or connectors. The pockets 168 may be open to the cable channels 166. In the illustrated embodiment, the cable extensions 164 are located proximate to a bottom of the cable housing 160. Other locations are possible in alternative embodiments. In the illustrated embodiment, the cable extensions 164 are angled relative to each other, such as angled nonparallel to each other. Optionally, the cable extensions 164 may be oriented at an angle of between 30° and 60° relative to each other, such as approximately 45°. For example, the upper portions of the cable extensions 164 may be located closer to each other and lower portions of the cable extensions 164 may be spread further apart from each other. Angling the cable extensions 164 outward away from each other spreads the power cables 120 apart from each other for better routing of the power cables 120. Angling the cable extensions 164 outward away from each other allows other components to be located in the space between the cable extensions 164.

In an exemplary embodiment, the cable housing 160 includes openings 170. The openings 170 may receive fasteners, such as bolts used to connect components of the charging inlet assembly 100. In the illustrated embodiment, the openings 170 are provided along sides of the cable extensions 164. Other locations are possible in alternative embodiments. The openings 170 may open to the pockets 168 and/or one or more of the cable channels 166.

In an exemplary embodiment, the cable housing 160 includes a ground terminal channel 172 configured to receive the ground terminal 115 (FIG. 1). The ground terminal channel 172 may be open at the rear to receive the ground terminal 115. In the illustrated embodiment, the ground terminal channel 172 is located between the cable extensions 164. Other locations are possible in alternative embodiments.

In an exemplary embodiment, the cable housing 160 includes a connector shroud 174 at the rear. The connector shroud 174 may surround the interface connector 130. The connector shroud 174 includes a port or slot configured to receive a mating connector configured to mate with the interface connector 130.

In an exemplary embodiment, the cable housing 160 includes a mounting bracket 178 at the front of the cable housing 160. The mounting bracket 178 is configured to interface with the rear mounting bracket 158 of the terminal housing 150 to secure the cable housing 160 to the terminal housing 150. The mounting bracket 178 may include latches, clips, fasteners, or other securing means to secure the mounting bracket 178 to the rear mounting bracket 158.

The control module 132 is configured to be received in the space between the terminal housing 150 and the cable housing 160. For example, the control module 132 may be received in the pocket 153 at the rear of the base 152. The control module 132 includes openings 134 that receive the charging terminals 110. The openings 134 may be aligned with the terminal channels 154 when the control module 132 is located in the pocket 153. In an exemplary embodiment, the control module 132 includes control contacts 136. The control contacts 136 are provided at the interface connector 130, such as for mating with a mating connector. In an exemplary embodiment, one or more of the control contacts 136 may be electrically connected to the control pilot terminal 116 and/or the proximity pilot terminal 118 to transmit signals between the pilot terminals 116, 118 and the interface connector 130. In an exemplary embodiment, one or more of the control contacts 136 may be electrically connected to temperature sensors 138 used to monitor the temperature of the charging terminals 112, 114. Optionally, one or more of the control contacts 136 may be electrically connected to the ground terminal 115 (FIG. 1). In an exemplary embodiment, the control contacts 136 may be formed as a lead frame that is overmolded by plastic material to form the control module 132. In other embodiments, the control contacts 136 may be stitched or otherwise inserted into a plastic housing or carrier that forms the control module 132. In further embodiments, the control module 132 may be a printed circuit board having circuits that define the control contacts 136.

The control module 132 and the interface connector 130 may be communicatively coupled to the other charging component, such as the charging connector or plug, to control the charging activity. The control module 132 may turn on the power supply, turn off the power supply, increase the power supply, and/or decrease the power supply. The charging operation may be controlled based on the control and/or proximity signals from the pilot terminals 116, 118. The charging operation may be controlled based on the operating temperatures of the charging terminals 110. For example, as the temperature increases or approaches an allowable operating temperature, the power supply may be decreased. For example, the voltage or current may be reduced. The charging operation may stop if the operating temperature of the charging terminals 110 is above a threshold temperature.

In an exemplary embodiment, the first and second charging terminals 112, 114 may be similar to each other. For example, the first and second charging terminals 112, 114 may be mirrored versions of each other. The charging terminal 112 extends between a mating end 180 and a terminating end 182. The charging terminal 112 includes a mating pin 184 at the mating end 180. The mating pin 184 is configured to be loaded through the opening 134 in the control module 132 and is configured to be received in the terminal channel 154 of the terminal housing 150. In an exemplary embodiment, the charging terminal 112 includes a terminal seal 186 surrounding the mating pin 184. The terminal seal 186 is configured to be sealed to the terminal housing 150 in the terminal channel 154. In an exemplary embodiment, the charging terminals 112 includes a pad 188 at the terminating end 182. The pad 188 is configured to be directly or indirectly connected to the corresponding power cables 120.

In an exemplary embodiment, the charging terminal 112 includes a terminal busbar 190 at the terminating end 182. For example, the terminal busbar 190 may be welded, crimped, or bolted to the pad 188 at the terminating end 182. The terminal busbar 190 includes a first portion 192 and a second portion 194. The first portion 192 is connected to the pad 188, such as being welded to the pad 188. The second portion 194 extends from the first portion 192 away from the pad 188. In an exemplary embodiment, the terminal busbar 190 includes an interface 196 at the second portion 194 configured to interface with another component, such as the power cables 120 or another busbar. In the illustrated embodiment, the terminal busbar 190 includes a threaded nut 198 at the second portion 194 used to connect the terminal busbar 190 to another busbar or other component. In an exemplary embodiment, the terminal busbar 190 is generally planar. For example, the first and second portions 192, 194 may be oriented along the plane. However, in alternative embodiments, the terminal busbar 190 is non-planar. For example, the second portion 194 may be angled relative to the first portion 192. In the illustrated embodiment, the charging terminals 112, 114 are oriented such that the terminal busbars 190 are angled relative to each other. The charging terminals 112, 114 may be oriented to align the pads 188 and the terminal busbars 190 with the pockets 168 in the cable housing 160. When the cable housing 160 is coupled to the terminal housing 150, the pads 188 and the terminal busbars 190 are received in the corresponding pockets 168.

Figure 4:
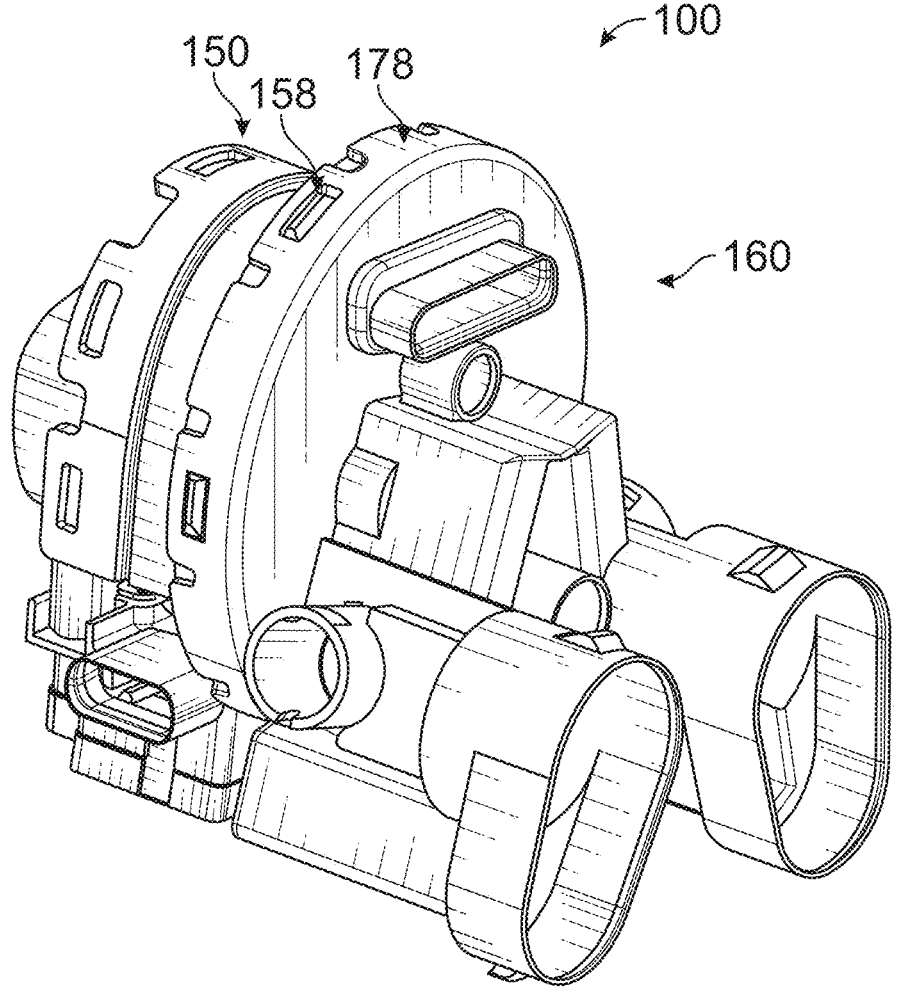
FIG. 4 is an assembled view of a subassembly of the charging inlet assembly showing the terminal housing coupled to the cable housing in accordance with an exemplary embodiment.

FIG. 4 is an assembled view of a subassembly 108 of the charging inlet assembly 100 showing the terminal housing 150 coupled to the cable housing 160. When assembled, the front of the cable housing 160 is coupled to the rear of the terminal housing 150. The mounting bracket 178 of the cable housing 160 is coupled to the rear mounting bracket 158 of the terminal housing 150. The terminal housing 150 and the cable housing 160 cover the control module 132 (FIG. 3) and the charging terminals 112, 114 (FIG. 3).

Figure 5:
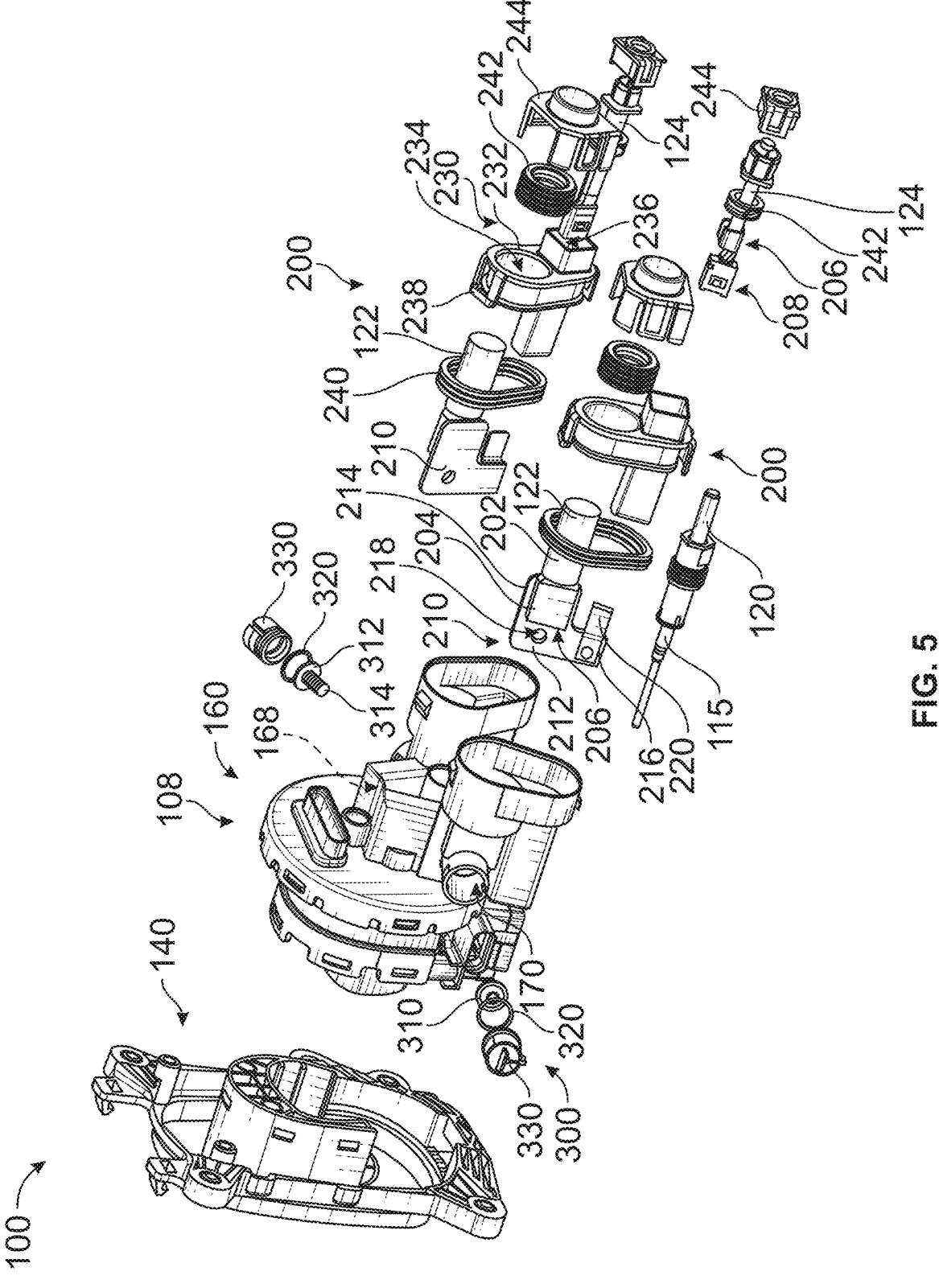
FIG. 5 is an exploded view of the charging inlet assembly in accordance with an exemplary embodiment.

FIG. 5 is an exploded view of the charging inlet assembly 100 in accordance with an exemplary embodiment. FIG. 5 shows the front housing 140, the subassembly 108, and a plurality of cable assemblies 200 configured to be coupled to the subassembly 108. FIG. 5 also shows the ground terminal 115 configured to be coupled to the subassembly 108. FIG. 5 further shows bolt assembly 300 configured to be coupled to the subassembly 108.

In an exemplary embodiment, each cable assembly 200 includes one of the DC cables 122 and one of the AC cables 124. Each cable assembly 200 is configured to be coupled to one of the corresponding charging terminals 112, 114. The termination of both the DC cable 122 and the AC cable 124 occurs interior (for example, within) the charging inlet housing 102. The DC cable 122 and the AC cable 124 both separately exit the charging inlet housing 102 and are configured to be routed to the respective locations. However, both the DC cable 122 and the AC cable 124 are electrically connected to the same charging terminal 112 or 114. As such, the charging inlet assembly 100 allows connection to the and ACS charging plug, using the separate and discrete DC and AC cables 122, 124 within the cable harness. The charging inlet assembly 100 is serviceable allowing separation of the cable harness from the charging terminals 110 to allow repair or replacement of the charging terminals 110 or the power cables 120.

In an exemplary embodiment, each cable assembly 200 includes the DC cable 122, the AC cables 124, and an adapter busbar 210 configured to electrically connect the DC cable 122 and the AC cable 124. The adapter busbar 210 is configured to be electrically coupled to the corresponding terminal busbar 190 (FIG. 3), such as by the bolt assembly 300. In an exemplary embodiment, each cable assembly 200 includes a cable adapter 230 that holds the DC cable 122 and the AC cable 124.

In an exemplary embodiment, each power cable 120 includes an outer jacket 202 and an inner conductor 204. The inner conductor 204 may be a solid wire, a stranded wire, a braided wire, or another type of electrical conductor. The power cable 120 extends to a terminating end 206 a portion of the outer jacket 202 may be removed at the terminating end 206 to expose the inner conductor 204. In various embodiments, the inner conductor 204 at the terminating end 206 may be directly terminated to the adapter busbar 210, such as by welding the inner conductor 204 to the adapter busbar 210. In other various embodiments, the inner conductor 204 at the terminating end 206 may be indirectly terminated to the adapter busbar 210, such as using a contact 208 connected to the end of the inner conductor 204. The contact 208 may be a socket contact in various embodiments. The contact 208 may be crimped or welded to the end of the cable, such as the AC cables 124. In other alternative embodiments, the inner conductor 204 of one of the power cables 120 may be terminated directly to the inner conductor of the other of the power cables 120. For example, the inner conductor 204 of the AC cable 124 may be welded to the inner conductor 204 of the DC cable 122, which is then welded to the adapter busbar 210.

The adapter busbar 210 is manufactured from an electrically conductive material, such as a metal material. The adapter busbar 210 may be a metal plate having a predetermined shape. In various embodiments, the adapter busbar 210 is planar. However, the adapter busbar 210 may be nonplanar in alternative embodiments. The adapter busbar 210 includes a main body 212, a first portion 214 extending from the main body 212, and a second portion 216 extending from the main body 212. In the illustrated embodiment, the first portion 214 is located at the rear of the adapter busbar 210. In the illustrated embodiment, the second portion 216 is located at the bottom of the adapter busbar 210. Other locations are possible in alternative embodiments. The adapter busbar 210 may include additional portions or extensions in alternative embodiments. In other various embodiments, the adapter busbar 210 may be provided without the first portion 214 and/or the second portion 216. In an exemplary embodiment, the main body 212 includes an opening 218 that receives the bolt assembly 300, which is used to connect the adapter busbar 210 with the corresponding terminal busbar 190. Other connection means may be used in alternative embodiments, such as a welded connection, spring fingers, a pin and socket connection, or another type of connection.

In an exemplary embodiment, the adapter busbar 210 includes a mating tab 220 extending from the second portion 216. The contacts 208 is configured to be coupled to the mating tab 220. For example, the mating tab 220 may be plugged into the socket of the contacts 208 to electrically connect the contact 208 with the mating tab 220 and the adapter busbar 210. In the illustrated embodiment, the mating tab 220 extend rearward from the second portion 216. Other locations or orientations are possible in alternative embodiments. The first portion 214 may additionally or alternatively include the mating tab 220.

The cable adapter 230 includes an adapter body 232 configured to be coupled to the cable housing 160. In an exemplary embodiment, the adapter body 232 is a molded part, such as a plastic molded part. The adapter body 232 is manufactured from a dielectric material, such as a plastic material. The adapter body 232 includes separate cable channels 234, 236 that receive the DC cable 122 and the AC cables 124, respectively. The adapter body 232 positions the DC cable 122 relative to the AC cables 124, such as to align the DC cable 122 with the first portion 214 and the AC cable 124 with the second portion 216. Optionally, the cable channels 234, 236 may have different sizes to accommodate the different size power cables 120. In the illustrated embodiment, the cable channels 234 is located proximate to a top of the adapter body 232 and the cable channel 236 is located proximate to a bottom of the adapter body 232. Other positions are possible in alternative embodiments. In the illustrated embodiment, the adapter body 232 is oval-shaped to accommodate the two cable channels 234, 236. However, the adapter body 232 may have other shapes in alternative embodiments. In various embodiments, the adapter body 232 may include shrouds or posts extending from the front and/or the rear and surrounding the cable channel 236 and/or the cable channel 234 to accommodate the AC cables 124 and/or the DC cable 122 and/or the contacts 208.

In an exemplary embodiment, the adapter body 232 includes latches 238 extending therefrom. The latches 238 are used to secure the adapter body 232 to the cable housing 160. Other types of securing features may be used in alternative embodiments, such as clips, fasteners, and the like.

In an exemplary embodiment, the cable adapter 230 includes an adapter seal 240 configured to be coupled to the adapter body 232. The adapter seal 240 is configured to be sealingly coupled to the adapter body 232 and to the cable housing 160. The adapter seal 240 may surround the exterior of the adapter body 232 in various embodiments. In other embodiments, the adapter seal 240 may be located at the front of the adapter body 232 to engage the cable housing 160 when the cable adapter 230 is coupled to the cable housing 160.

In an exemplary embodiment, the cable assembly 200 includes cable seals 242 that are configured to be sealed between the power cables 120 and the adapter body 232. The cable seals 242 may be received in the corresponding cable channels 234, 236.

In an exemplary embodiment, the cable adapter 230 includes cable covers 244 configured to be coupled to the power cables 120 and configured to be coupled to the adapter body 232. The cable covers 244 may be used to hold the cable seals 242 in the adapter body 232. The cable covers 244 may provide strain relief for the power cables 120. In various embodiments, the cable covers 244 are latchably coupled to the adapter body 232. However, the cable covers 244 may be secured by other means in alternative embodiments.

During assembly, the various components may be loaded onto the end of the corresponding power cables 120. The power cables 120 may be received in the corresponding cable channels 234, 236 of the cable adapter 230. The cable seals 242 are configured to be sealed between the outer jackets 202 of the power cables 120 and the adapter body 232. The cable covers 244 are configured to be coupled to the adapter body 232 to hold the power cables 120 in the cable channels 234, 236. During assembly, the ends of the power cables 120 are terminated to the adapter busbar 210. In the illustrated embodiment, the end of the DC cable 122 is welded directly to the first portion 214 of the adapter busbar 210. In the illustrated embodiment, the contacts 208 is crimped to the end of the AC cable 124. The AC cable 124 is electrically connected to the adapter busbar 210 by plugging the mating tab 220 into the socket of the contact 208. The adapter busbar 210 electrically connects the DC cable 122 and the AC cables 124 to allow connection of both of the cables 122, 124 to the corresponding charging terminal 112 or 114. In an exemplary embodiment, the bolt assembly 300 is used to connect the adapter busbar 210 to the terminal busbar 190 of the corresponding charging terminal 112, 114.

In an exemplary embodiment, the bolt assembly 300 includes a bolt 310, a bolt seal 320, and a bolt cover 330. The bolt 310 includes a head 312 and a threaded shaft 314. The bolt 310 is configured to pass through the openings in the adapter busbar 210 and the terminal busbar 190. The threaded shaft 314 is configured to be threadably coupled to the nut 198. The bolt 310 is tightened to create a reliable mechanical and electrical connection between the adapter busbar 210 in the terminal busbar 190. The bolt assembly 300 is received in the opening 170 and the cable housing 160. The bolt seal 320 is configured to seal the bolt 310 to the cable housing 160. The bolt cover 330 is received in the opening 170 to hold the in place and prevent dirt and debris from entering the opening 170. The bolt assembly 300 creates a separable interface between the adapter busbar 210 and the terminal busbar 190. For example, the bolt assembly 300 may be removed to allow removal and/or replacement of the cable assemblies 200 and/or the charging terminals 110. Other types of separable interfaces may be used in alternative embodiments in lieu of the bolt assembly 300. For example, the adapter busbar 210 and the terminal busbar 190 may be connected by spring elements having separable mating interfaces or by blade and socket type interfaces. In other alternative embodiments, a permanent connection may be made between the adapter busbar 210 and the terminal busbar 190, such as a welded connection.

Figure 6:
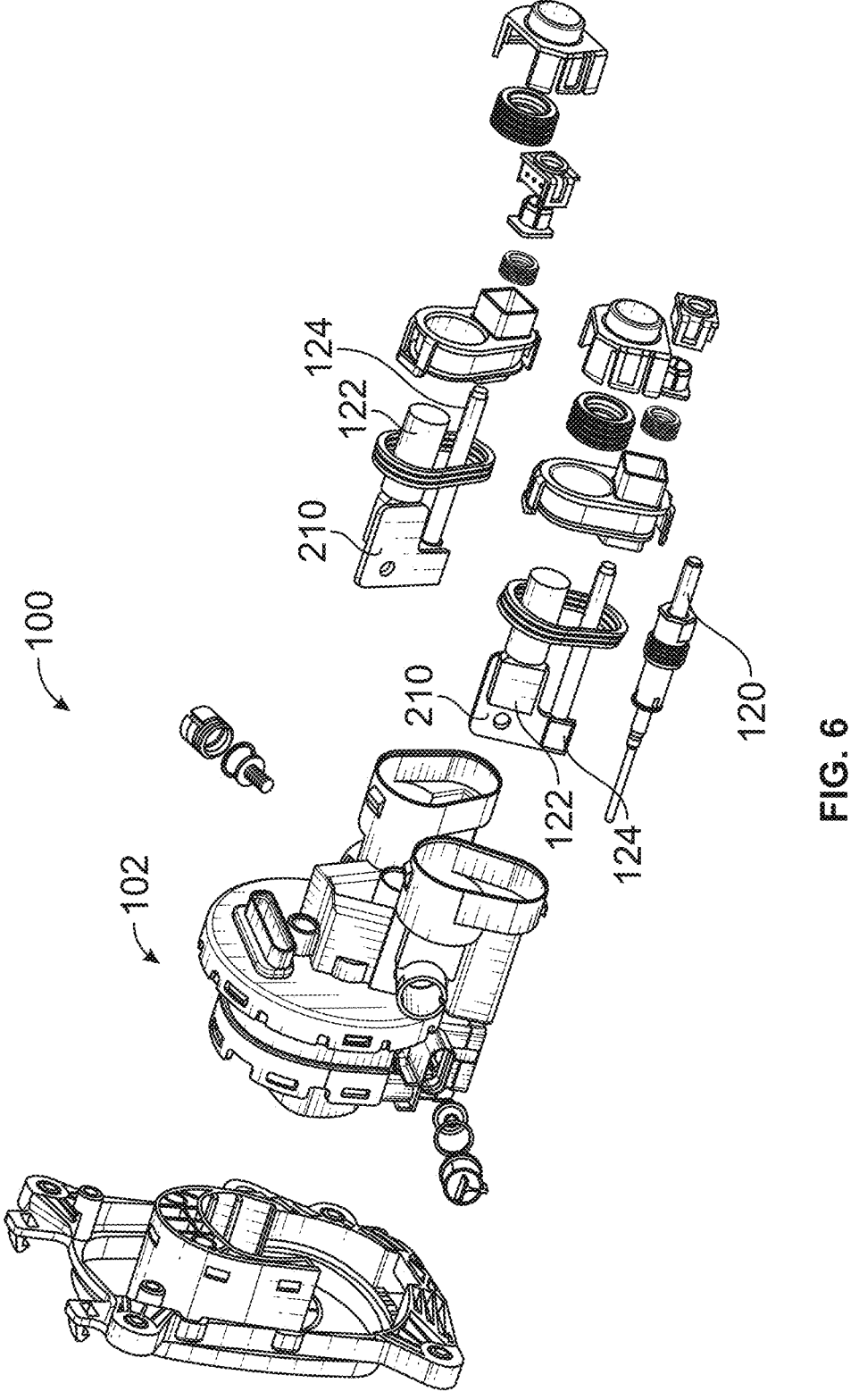
FIG. 6 is an exploded view of the charging inlet assembly in accordance with an exemplary embodiment.

FIG. 6 is an exploded view of the charging inlet assembly 100 in accordance with an exemplary embodiment. FIG. 6 illustrates the DC cable 122 and the AC cable 124 both terminated to the adapter busbar 210 by welded connections rather than using the contacts 208 (FIG. 5). The termination of both the DC cable 122 and the AC cable 124 occurs interior (for example, within) the charging inlet housing 102. The DC cable 122 and the AC cable 124 both separately exit the charging inlet housing 102 and are configured to be routed to the respective locations. However, both the DC cable 122 and the AC cable 124 are electrically connected to the same charging terminal 112 bore 114. As such, the charging inlet assembly 100 allows connection to the and ACS charging plug, using the separate and discrete DC and AC cables 122, 124 within the cable harness. The charging inlet assembly 100 is serviceable allowing separation of the cable harness from the charging terminals 110 to allow repair or replacement of the charging terminals 110 or the power cables 120.

Figure 7:
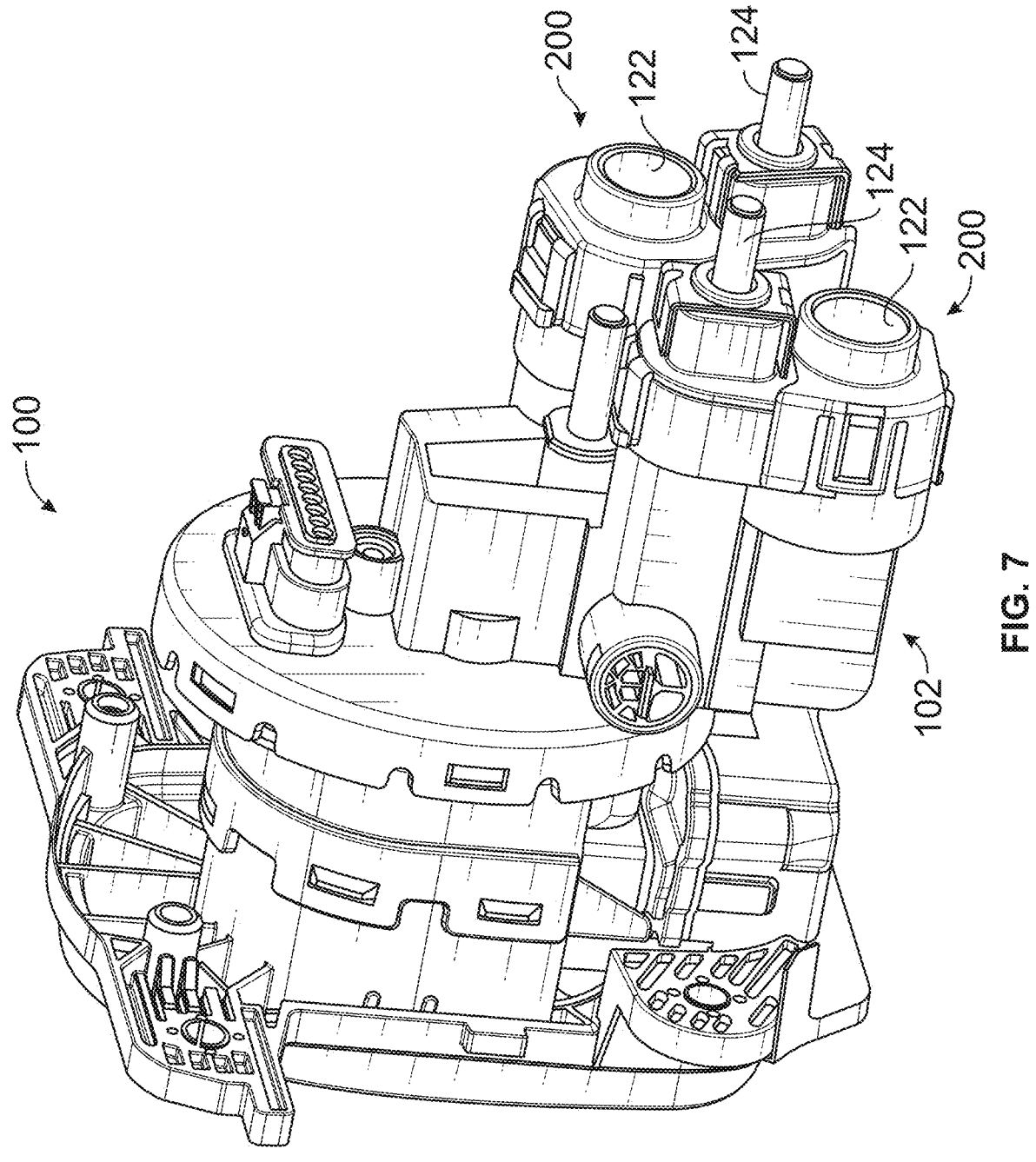
FIG. 7 is a rear perspective view of the charging inlet assembly in accordance with an exemplary embodiment.
Figure 8:
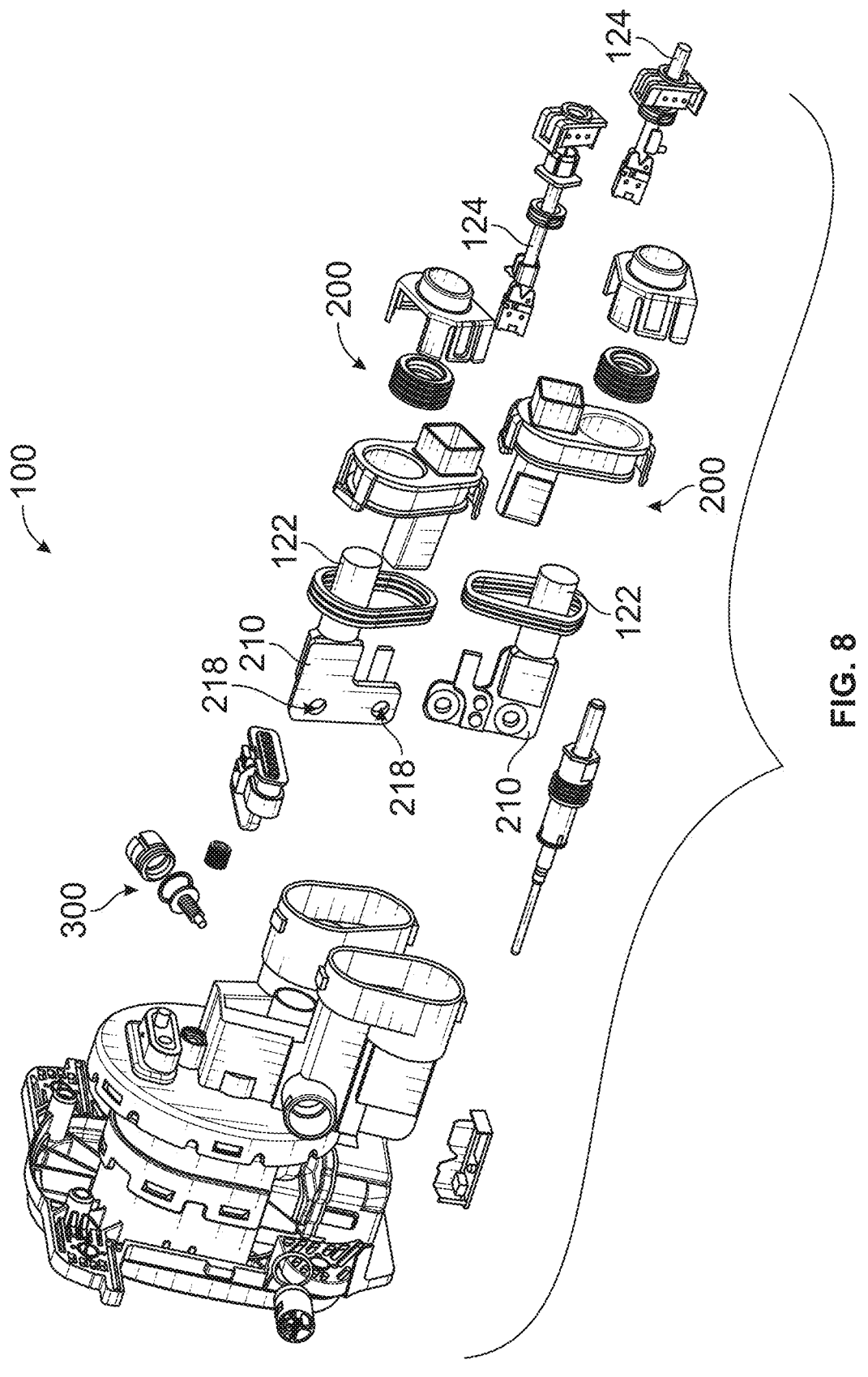
FIG. 8 is an exploded view of the charging inlet assembly in accordance with an exemplary embodiment.

FIG. 7 is a rear perspective view of the charging inlet assembly 100 in accordance with an exemplary embodiment. FIG. 8 is an exploded view of the charging inlet assembly 100 in accordance with an exemplary embodiment. FIGS. 7 and 8 illustrate the cable assemblies 200 having a different arrangement and orientation compared to the embodiment shown in FIG. 5. In the illustrated embodiment, the cable assemblies 200 are inverted relative to each other (for example, one of the cable assemblies is oriented upside down). As such, the cable assemblies 200 are identical to each other, which make assembly easier and less expensive.

The cable assemblies 200 are designed to be inserted in either orientation. For example, the adapter busbar 210 includes two openings 218 at different locations (for example, near top and near bottom) to selectively receive the bolt assembly 300 depending on the orientation.

The charging inlet housing 102 is designed to receive the cable assemblies 200 in the inverted orientations. Optionally, the charging inlet housing 102 may be designed to accommodate the cable assemblies 200 in either orientation. For example, the cable channels 166 may be configured to receive either the DC cable 122 or the AC cable 124 and contact 208.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet assembly for an electric vehicle comprising:

a charging inlet housing having terminal channels and cable channels associated with the terminal channels;

charging terminals received in the corresponding terminal channels and held in the charging inlet housing, the charging terminals having pins configured to be connected to a charging plug, the charging terminals including a first charging terminal and a second charging terminal;

a first cable assembly received in the corresponding cable channels, the first cable assembly including a first DC cable and a first AC cable, the first DC cable and the first AC cable being separate and discrete cables, the first DC cable and the first AC cable both electrically connected to the first charging terminal inside the charging inlet housing; and a second cable assembly received in the corresponding cable channels, the second cable assembly including a second DC cable and a second AC cable, the second DC cable and the second AC cable being separate and discrete cables, the second DC cable and the second AC cable both electrically connected to the second charging terminal inside the charging inlet housing.

2. The charging inlet assembly of claim 1, wherein the charging terminals are arranged for mating with a standard NACS charging plug.

3. The charging inlet assembly of claim 1, wherein the first DC cable and the first AC cable are terminated interior of the charging inlet housing, and wherein the second DC cable and the second AC cable are terminated interior of the charging inlet housing.

4. The charging inlet assembly of claim 1, wherein the charging inlet housing includes a first bolt opening receiving a first bolt and a second bolt opening receiving a second bolt, the first bolt mechanically and electrically connecting the first charging terminal and the first cable assembly at a first separable interface, the second bolt mechanically and electrically connecting the second charging terminal and the second cable assembly at a second separable interface.

5. The charging inlet assembly of claim 1, wherein the charging terminals include terminal busbars at terminating ends, the first cable assembly being coupled to the terminal busbar of the first charging terminal at a first separable interface, the second cable assembly being coupled to the terminal busbar of the second charging terminal at a second separable interface.

6. The charging inlet assembly of claim 5, wherein the first cable assembly includes a first adapter busbar and the second cable assembly includes a second adapter busbar, the first DC cable and the first AC cable both electrically connected to the first adapter busbar, the first adapter busbar being electrically connected to the terminal busbar of the first charging terminal at the first separable interface, the second DC cable and the second AC cable both electrically connected to the second adapter busbar, the second adapter busbar being electrically connected to the terminal busbar of the second charging terminal at the second mating interface.

7. The charging inlet assembly of claim 1, wherein the first cable assembly includes a first adapter busbar, the first DC cable being electrically connected to the first adapter busbar, the first AC cable being electrically connected to the first adapter busbar, and wherein the second cable assembly includes a second adapter busbar, the second DC cable being electrically connected to the second adapter busbar, the second AC cable being electrically connected to the second adapter busbar.

8. The charging inlet assembly of claim 7, wherein the first DC cable is welded directly to the first adapter busbar and wherein the second DC cable is welded directly to the second adapter busbar.

9. The charging inlet assembly of claim 7, wherein the first AC cable is welded directly to the first adapter busbar and wherein the second AC cable is welded directly to the second adapter busbar.

10. The charging inlet assembly of claim 7, wherein the first adapter busbar includes a first mating tab, the first AC cable having a first socket contact terminated to an end of the first AC cable, the first socket contact terminated to the first mating tab, and wherein the second adapter busbar includes a second mating tab, the second AC cable having a second socket contact terminated to an end of the second AC cable, the second socket contact terminated to the second mating tab.

11. The charging inlet assembly of claim 1, wherein an end of the first AC cable is welded directly to an end of the first DC cable and wherein an end of the second AC cable is welded directly to an end of the second DC cable.

12. The charging inlet assembly of claim 1, wherein the first cable assembly includes a first cable adapter having a first adapter body, the first adapter body including a first DC cable channel receiving the first DC cable and a first AC cable channel receiving the first AC cable, and wherein the second cable assembly includes a second cable adapter having a second adapter body, the second adapter body including a second DC cable channel receiving the second DC cable and a second AC cable channel receiving the second AC cable.

13. The charging inlet assembly of claim 11, wherein the first cable adapter includes cable seals in the first DC cable channel and the first AC cable channel to seal to the first DC cable and the first AC cable, respectively, and wherein the second cable adapter includes cable seals in the second DC cable channel and the second AC cable channel to seal to the second DC cable and the second AC cable, respectively.

14. The charging inlet assembly of claim 11, wherein the first cable adapter includes a first adapter seal, the first cable adapter received in the charging inlet housing such that the first adapter seal sealingly engages the first cable adapter and the charging inlet housing, and wherein the second cable adapter includes a second adapter seal, the second cable adapter received in the charging inlet housing such that the second adapter seal sealingly engages the second cable adapter and the charging inlet housing.

15. The charging inlet assembly of claim 1, wherein the charging inlet housing includes a front housing having a charging plug interface, a terminal housing holding the charging terminals, and a cable housing holding the first and second cable assemblies, the front housing, the terminal housing and the cable housing being separate and discrete components coupled together to form the charging inlet housing.

16. A charging inlet assembly for an electric vehicle comprising:
    a charging inlet housing having terminal channels and cable channels associated with the terminal channels;
    charging terminals received in the corresponding terminal channels and held in the charging inlet housing, the charging terminals having pins at mating ends configured to be connected to a charging plug, the charging terminals having terminal busbars at terminating ends opposite the mating ends, the charging terminals including a first charging terminal and a second charging terminal;
    a first cable assembly received in the corresponding cable channels, the first cable assembly including a first adapter busbar, the first cable assembly including a first DC cable and a first AC cable, the first DC cable and the first AC cable being separate and discrete cables, the first DC cable and the first AC cable both electrically connected to the first adapter busbar, the first adapter busbar being electrically connected to the terminal busbar of the first charging terminal; and
    a second cable assembly received in the corresponding cable channels, the second cable assembly including a second adapter busbar, the second cable assembly including a second DC cable and a second AC cable, the second DC cable and the second AC cable being separate and discrete cables, the second DC cable and the second AC cable both electrically connected to the second adapter busbar, the second adapter busbar being electrically connected to the terminal busbar of the second charging terminal.

17. The charging inlet assembly of claim 16, wherein the first DC cable and the first AC cable are terminated interior of the charging inlet housing, and wherein the second DC cable and the second AC cable are terminated interior of the charging inlet housing.

18. The charging inlet assembly of claim 16, wherein the charging inlet housing includes a first bolt opening receiving a first bolt and a second bolt opening receiving a second bolt, the first bolt mechanically and electrically connecting the first charging terminal and the first cable assembly at a first separable interface, the second bolt mechanically and electrically connecting the second charging terminal and the second cable assembly at a second separable interface.

19. A charging inlet assembly for an electric vehicle comprising:
    a charging inlet housing having terminal channels and cable channels associated with the terminal channels;
    charging terminals received in the corresponding terminal channels and held in the charging inlet housing, the charging terminals having pins at mating ends configured to be connected to a charging plug, the charging terminals having terminating connectors at terminating ends, the charging terminals including a first charging terminal and a second charging terminal;
    a first cable assembly received in the corresponding cable channels, the first cable assembly including a first DC cable and a first AC cable, the first DC cable and the first AC cable being separate and discrete cables, the first cable assembly including a first connector, the first DC cable and the first AC cable both electrically connected to the first connector, the first connector being electrically coupled to the terminating connector of the first charging terminal at a first separable interface; and
    a second cable assembly received in the corresponding cable channels, the second cable assembly including a second DC cable and a second AC cable, the second DC cable and the second AC cable being separate and discrete cables, the second cable assembly including a second connector, the second DC cable and the second AC cable both electrically connected to the second connector, the second connector being electrically coupled to the terminating connector of the second charging terminal at a second separable interface.

20. The charging inlet assembly of claim 19, wherein the first DC cable and the first AC cable are terminated interior of the charging inlet housing, and wherein the second DC cable and the second AC cable are terminated interior of the charging inlet housing.

* * * * *